United States Patent

Syeda-Mahmood

Patent Number: 5,953,451
Date of Patent: Sep. 14, 1999

[54] METHOD OF INDEXING WORDS IN HANDWRITTEN DOCUMENT IMAGES USING IMAGE HASH TABLES

[75] Inventor: Tanveer F. Syeda-Mahmood, Rochester, N.Y.

[73] Assignee: Xerox Corporation, Stamford, Conn.

[21] Appl. No.: 08/878,512

[22] Filed: Jun. 19, 1997

[51] Int. Cl.[6] ........................................ G06K 9/00
[52] U.S. Cl. .................. 382/187; 382/203; 382/292
[58] Field of Search .................... 382/186, 187, 382/292, 228, 203, 305; 707/3–6

[56] References Cited

U.S. PATENT DOCUMENTS

| | | | |
|---|---|---|---|
| 4,513,441 | 4/1985 | Henshaw | 382/280 |
| 4,747,146 | 5/1988 | Nishikawa et al. | 382/112 |
| 5,351,310 | 9/1994 | Califano et al. | 382/199 |
| 5,392,363 | 2/1995 | Fujisaki et al. | 382/187 |
| 5,610,996 | 3/1997 | Eller | 382/187 |
| 5,687,254 | 11/1997 | Poon et al. | 382/229 |
| 5,719,959 | 2/1998 | Krtolica | 382/209 |

OTHER PUBLICATIONS

Editor Allen B. Tucker, Jr., The Computer Science and Engineering Handbook, CRC Press, 1996.

Articles by Y. Lamdan and H.J. Wolfson entitled "Geometric Hashing: A general and efficient model–based recognition scheme", in Proceeding of the International Conference on Computer Vision, pp. 218–249, 1988, and "Transformation invariant indexing" in Geometric Invariants in Computers Vision, MIT Press, pp. 334–352, 1992.

Article by F.C.D. Tsai entitled "Geometric hashing with line features" in Pattern Recognition, vol. 27, No. 3, pp. 377–389, 1994.

An Article by W.E.L. Grimson and D. Huttenlocher entitled "On the sensitivity of geometric hashing", in Proceedings International Conference on Computer Vision, pp. 334–339, 1990.

Article by G. Bebis, M. Georgiopolous and N. Lobo entitled "learning geometric hashing functions for model–based object recognition", in Proceedings International Conference on Computer Vision, pp. 543–548, 1995.

Article by I. Rigoustos and R. Hummel, "massively parallel model matching: Geometric hashing on the connection machine" in IEEE Computer, pp. 33–41, Feb. 1992.

Article by R. Manmatha, C. Han and E. Riseman, entitled "Word spotting: A new approach to indexing handwriting" in Proceedings IEEE Computer Vision and Pattern Recognition Conference, pp. 631–637, 1996.

*Primary Examiner*—Amelia Au
*Assistant Examiner*—Martin E. Miller
*Attorney, Agent, or Firm*—Gary B Cohen

[57] ABSTRACT

A method of locating handwritten words in handwritten text images under a variety of transformations including changes in document orientation, skew, noise, and changes in handwriting style of a single author which avoids a detailed search of the image for locating every word by pre-computing relevant information in a hash table and indexing the table for word localization. Both the hash table construction and indexing can be done as fast operations taking time quadratic in the number of basis points. Generally, the method involves four stages: (1) Pre-processing where features for word localization are extracted; (2) Image hash table construction; (3) Indexing where query word features are used to look up hash table for candidate locations; and (4) Verification, where the query word is projected and registered with the underlying word at the candidate locations. The method has applications in digital libraries, handwriting tokenization, document management and OCR systems.

9 Claims, 6 Drawing Sheets

While it is true that these problems exist also for image databases designed for a stand alone use, they are felt more keenly when such databases are designed .... corner)

FIG. 2A database

FIG. 2B

While it is true that these problems exist also for image ~~database~~ designed for a stand ~~alone use~~, they are felt more keenly when such ~~database~~ are designed .... corner)

FIG. 2C

METHOD OF INDEXING WORDS IN HANDWRITTEN DOCUMENT IMAGES USING IMAGE HASH TABLES

FIELD OF THE INVENTION

This invention is related to handwriting recognition and indexing and, more particularly, to a handwriting localization method using image hash tables to index handwritten words.

BACKGROUND OF THE INVENTION

The ability to detect and recognize handwritten words in handwritten documents is important for several applications. While the strategic importance of such a capability in current commercial handwriting recognition products is clear, its use in applications such as digital libraries and document management cannot be ignored. With digital libraries, for example, there is a major concern over the preservation and electronic conversion of historical paper documents. Often, these documents are handwritten and in calligraphic styles, as in a sample of a church record used in genealogy studies illustrated in FIG. 1. An important aspect of the use of electronic versions of such documents is their access based on word queries. Handwritten keyword extraction and indexing can also be a valuable capability for document management, in handling a variety of irregular paper documents such as handwritten notes, marks on engineering drawings, memos and legacy documents.

While an OCR algorithm can be used to extract text keywords for index creation of scanned printed text documents, such a process is not yet an option for handwritten documents due to a lack of robust handwriting recognition algorithms. An alternative in such situations is to avoid index creation altogether, by storing some feature-abstracted form of the bitmaps, and directly "indexing" the contents of such representations using the handwritten word query pattern. Even so, handwritten word indexing is a considerably more difficult problem than printed text indexing due to at least two reasons. First, the same query word could be written differently at different locations in a document even when the document is written by a single author. In cursive script, this often means that a word is written as a collection of word segments separated by intra-word separations that are characteristic of the author. FIGS. 2A–C illustrate this situation, where the word "database" is written by the same author differently in the various instances it occurs. Further, the different instances could exhibit different amounts of global skew, because lines of handwritten text are often not parallel as in printed text. Secondly, a detailed examination of each word location for potential matches to a query word becomes computationally expensive preventing fast retrieval of such documents.

The present method of locating handwritten words was motivated by an application that required image indexing of old calligraphic handwritten church record documents for purposes of tracing genealogy. These documents were written against a tabular background, as shown in FIG. 1. On being given a query about a person's name, the task was to locate the relevant records. While the formulation of query word patterns for these documents is an interesting problem, for the purposes of this disclosure the focus is on the problem of matching handwritten words after they have been formulated by a user—perhaps by a training process that generates such pattern queries from actual typed text queries, or perhaps such queries are derived from the handwritten document itself.

The present method of localizing handwritten word patterns in documents exploits a data structure, called the image hash table generated in a pre-processing step, to succinctly represent feature information needed to localize any word without a detailed search of the document. The use of an image hash table to localize objects draws upon ideas of geometric hashing that has been used earlier for identification of objects in pre-segmented image regions which is discussed in articles by Y. Lamdan and H. J. Wolfson entitled "Geometric hashing: A general and efficient model-based recognition scheme", in Proceeding of the International Conference on Computer Vision, pages 238–249, 1988, and "Transformation invariant indexing" in Geometric Invariants in Computer Vision, MIT Press, pages 334–352, 1992. More work has been done in extending the basic geometric hashing scheme for use with line features as described in an article by F. C. D. Tsai entitled "Geometric hashing with line features" in Pattern Recognition, Vol. 27, No. 3, pages 377–389, 1994. An extensive analysis of the geometric hashing scheme has been done in an article by W. E. L. Grimson and D. Huttenlocher entitled "On the sensitivity of geometric hashing", in Proceedings International Conference on Computer Vision, pages 334–339, 1990. Finding good geometric hash functions has also been explored in an article by G. Bebis, M. Georgiopolous and N. Lobo entitled "Learning geometric hashing functions for model-based object recognition" in Proceedings International Conference on Computer Vision, pages 543–548, 1995, and an extension of geometric hashing using the concept of rehashing the hash table has been discussed in an article by I. Rigoustos and R. Hummel "Massively parallel model matching: Geometric hashing on the connection machine" in IEEE Computer, pages 33–41, February 1992. All the prior work has used the geometric hashing technique for purposes of model indexing in object recognition where the task is to determine which of the models in a library of models is present in the indicated region in the image. The localization of handwritten words in unsegmented handwritten documents is an instance of image indexing (rather than model indexing) for which no prior work on using geometric hashing exists. The work that comes closest is the one that uses a serial search of the images for localizing handwritten words as described in an article by R. Manmatha, C. Han and E. Riseman, entitled "Word spotting: A new approach to indexing handwriting" in Proceedings IEEE Computer Vision and Pattern Recognition Conference, pages 631–637, 1996.

Disclosures of all of the references cited and/or discussed above in this Background are incorporated herein by reference for their teaching.

SUMMARY OF THE INVENTION

The invention is a method of locating and recognizing handwritten word queries in handwritten documents. An ability to do handwritten word indexing not only extends the capability of current document management systems by allowing handwritten documents to be treated in a uniform manner with printed text documents but can also be the basis for compressing such documents by handwritten word tokenization.

The localization of words in handwritten documents exploits a data structure called the image hash table that records essential information needed to locate any word in the document. Localization or indexing of a specific word in the document is done by indexing the hash table with information derived from the word is such a manner that the prominent hits in the table directly indicate candidate locations of the word in the document, thus avoiding a detailed search. The method accounts for changes in appearance of the handwritten word in terms of orientation, skew, and intra-word separation that represent the way a single author may write the same word at different instances. More specifically, localizing any word in the image hash table is done by indexing the hash table with features computed from the word pattern. The top hits in the table are candidate locations most likely to contain the word. Such an indexing automatically gives pose information which is then used to project the word at the indicated location and verified. Verification then involves determining the extent of match between the underlying word and the projected word. The generation and indexing of image hash table takes into account the changes in appearance of the word under 2D affine transforms, changes in the orientation of the lines of text, overall document skew, changes in word appearance due to occlusions, noise, or intra-word handwriting variations made by a single author.

The details of this method for localization and detection of handwritten words are described in the Detailed Description below. Generally, it involves four stages: (1) Pre-processing where features for word localization are extracted; (2) Image hash table construction; (3) Indexing where query word features are used to look up hash table for candidate locations; and (4) Verification, where the query word is projected and registered with the underlying word at the candidate locations.

The method disclosed here has the following advantages: 1) Fast method of localizing handwritten word patterns in handwritten documents without detailed text segmentation. 2) Greater ability to deal with handwriting variation of a single author than is possible in current handwriting recognition research. 3) Means to localize and detect arbitrary 2d (rigid) objects in a much wider class of images than handwritten documents. 4) Means for organizing documents (and other images) in a database that enables fast search and retrieval.

DESCRIPTION OF THE DRAWINGS

The accompanying drawings, which are incorporated in and form part of the specification, illustrate an embodiment of the present invention and, together with the description, serve to better explain the operation features, and advantages of the invention. It should be understood, however, that the invention is not limited to the precise arrangements and instrumentalities shown.

FIG. 2A illustrates a sample handwritten document image;

FIG. 2B illustrates a handwritten query word;

FIG. 2C illustrate a subject query word projected at candidate locations;

DETAILED DESCRIPTION OF THE INVENTION

Figure 3:
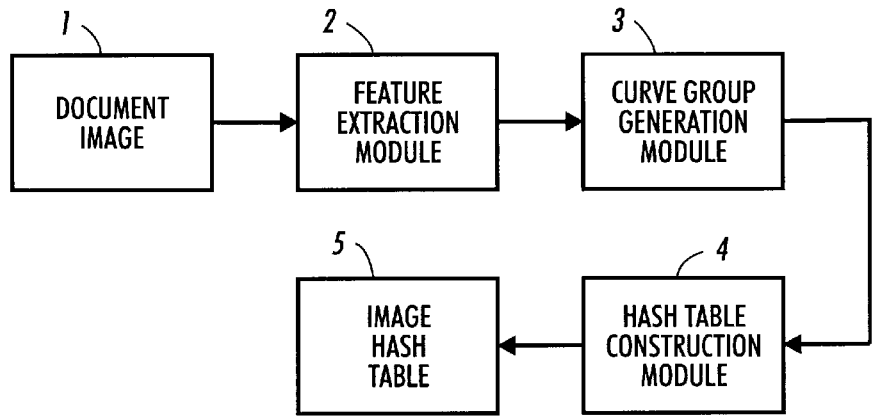
FIG. 3 illustrated a block diagram of modules of the invention engaged in hash table construction.

Referring to FIG. 3, the components for carrying out the present method of hash table construction are illustrated. In the pre-processing step of the invention, the original documents obtained by scanning handwritten pages at high resolution (200 dpi or higher) are used. Within the Feature Extraction Module 2, connected component regions of scanned Document Images 1 are formed. Although several methods of finding connected components exist, the following algorithm is used to determine the connected components regions in bitmaps:

1. Record run lengths of "on" pixels (assuming white background) per image pixel row using low[i], high[i] arrays that maintain the start and end points of the run lengths.
2. Initially put all runlengths in separate groups denoted by $C\_\{i\}$ for runlength i.
3. For all end point pixels (k,l) in low[i] and high[i] arrays, do the following steps:
   Step A: Find the number of "on" neighboring pixels (k',l') and their associated run lengths, and
   Step B: Merge the given runlength with the neighboring runlength identified above. This is recorded by having all merged runlength having the same group identification.

The above algorithm can be efficiently implemented using a data structure called the union-find data structure as described in a book by Cormen, Leisersen and Rivest entitled "Introduction to algorithms", MIT Press, 1994, to run in time linear in the number of runlengths in the image.

Boundary points are determined on the connected component regions as those points that have at least one "off" neighbor. A cyclic trace of such boundary pixels is used to yield curves representing the boundaries of the connected component regions. The curves are smoothed using a conventional line-segment approximation algorithm. Finally, corner features are extracted from the curves as those points where significant curvature deviation occurs. That is, where the angle between two incident lines is greater than a specified threshold. Other methods of curve tracing and corner feature detection can be used without significantly affecting the claims in this invention. Note that since the images are assumed to be scanned at high resolution, the lines are thick enough so that junctions are also manifested as corners in such images. Corner features on a curve are chosen as the basic unit for localization using the rationale that although not all curves come from single words, especially in the presence of occlusions and noise, features generated from within a curve are more likely to point to a single image location than an arbitrary triple of features chosen randomly across the image.

The pre-processing step of curve extraction and feature generation can be applied uniformly to a document image or to a query word represented as an image pattern, and takes time linear in the size of the image.

Curve Group Generation

To enable handwriting localization under changes in word appearance due to different intra-word spacing, groups of curves separated by intra-word separation are assembled within the Curve Group Generation Module 3. Such a group captures curve segments belonging to the same word.

Detection of a line of text in a handwritten page image involves determining which of the individual word regions lie predominantly along a perceivable line of text. Unlike in printed text, deducing lines of text in handwritten document is difficult because handwritten text words are often not written on a straight line. Furthermore, consecutive lines of text may not be parallel as in printed text. Finally, an author may vary the inter-word and intra-word spacing while writing so that different instances of the same word may show writing differences. This makes the task of determining which word segments belong to a group difficult.

The method of text lines detection that is disclosed here is independent of page orientation, and does not assume that the individual lines of handwritten text are parallel. Furthermore, it does not require that all word regions be aligned with the text line orientation. The first operation performed on a bitmap image of a handwritten document is to pre-process the image using the Feature Extraction Module 2 of FIG. 3 to generate connected components of dark regions constituting word segments as well as curves formed from the boundaries of such connected regions. This pre-processing stage also records the centroids of the regions. The orientation of the word segment regions is determined as the direction of the moment-of-inertia axis of the region. The formula for finding the moment of inertia axis is given in Chapter 3 of the book entitled "Robot Vision" by B. K. P. Horn, MIT Press, 1986. A histogram of orientations is generated and its peaks automatically selected to represent major word orientations in the image. For each of the dominant orientations selected a line of the specified orientation is drawn through the centroids of each of the regions. A clustering of these lines is done to determine groups of such lines. The Hough transform described in a book by D. Ballard and C. Brown entitled "Computer Vision", Prentice-Hall, Chapter 4, pages 123–124, 1982, was used to record this information. The resulting data structure, called the Hough transform table, is a two-dimensional array that records the number of points (centroids of region here) that lie along or lie close to a line of specified orientation and position. The highest valued entries in this table are taken to correspond to candidate lines of text. The regions whose centroids contribute to the peak table entries are noted. These word segment regions thus are taken to form the lines of text in the handwritten document image.

The curve groups capture word segments that form part of the same word. Once the lines of text, and hence the word segments that lie along a line of text, are determined, grouping involves assembling all such word segments that are separated by a distance—characterizing intra-word separation. The intra-word separation is estimated as follows: For each line of text determined above, the boundaries of the word segment regions lying on the line are used to determine two extremal points per region; that is, all the boundary points of a region are projected onto the line, and the beginning and end points noted. A projection of a given point onto a line is the point of intersection of a perpendicular line through the given point with the given line. All such projections are now sorted in an increasing order along the line, using a conventional sorting algorithm. Distances between the end point of a region and the beginning point of another are noted to represent separations between word segments. These distances are recorded for all lines of text. A histogram of such distances is generated. For most handwritten documents such a histogram shows at least two distinct peaks. The peak at the lowest separation distance is noted as intra-word separation. Using the intra-word separation, curve groups are formed by grouping word segment regions that are separated along the line of text orientation by a distance within a certain bound of the intra-word separation determined above. The grouping of curves separated by intra-word separation (+/− a chosen threshold) is done using the union-find data structure mentioned earlier.

Image Hash Table

Using the features derived above, a data structure called an image hash table is developed within the Hash Table Construction Module 4 and is used to succinctly represent information in the position of features in curves in curve groups in a manner that helps locate a query handwritten word. To understand the idea of an image hash table, suppose for the sake of simplicity, each curve group consists of a single curve. Suppose the task is to locate a given query curve in an image consisting of this curve among others. Consider three consecutive non-collinear feature points (O, $P_1$, $P_2$) on the given query curve. Then it is well-known that the coordinates of any other point P of the curve can be expressed in terms of the coordinates of points (O, $P_1$, $P_2$) (called basis triples) as:

$$OP = \alpha OP_1 + \beta OP_2$$

The coordinates $(\alpha, \beta)$ are called affine coordinates and they are invariant to affine transformations. Thus if the given curve appears in the image skewed, or rotated, the corresponding points on the transformed image curve will have the same coordinates with respect to the transformed basis triples in the transformed image curve. Thus, one way to check if a curve at an image location matches a given curve is to see if enough feature points on the image curve have the same affine coordinates with respect to some image basis triple (O', $P'_1$, $P'_2$) on the image curve. In this case, it can also be inferred that the basis triples on the image curve and the given (query) curve correspond. From such a correspondence, the pose information can be derived as an affine transform:

$$(A, T) = \begin{pmatrix} a & b \\ c & d \end{pmatrix} + \begin{pmatrix} T_1 \\ T_2 \end{pmatrix}$$

that is obtained by solving a set of linear equations as:

$$\begin{pmatrix} O_x & O_y & 0 & 0 & 1 & 0 \\ 0 & 0 & O_x & O_y & 0 & 1 \\ P_{1x} & P_{1y} & 0 & 0 & 1 & 0 \\ 0 & 0 & P_{1x} & P_{1y} & 0 & 1 \\ P_{2x} & P_{2y} & 0 & 0 & 1 & 0 \\ 0 & 0 & P_{2x} & P_{2y} & 0 & 1 \end{pmatrix} \begin{pmatrix} a \\ b \\ c \\ d \\ T_1 \\ T_2 \end{pmatrix} = \begin{pmatrix} O'_x \\ O'_y \\ P_{1x} \\ P_{1y} \\ P'_{2x} \\ P'_{2y} \end{pmatrix}$$

where $(O_x, O_y) = O$ and x and y refer to the x and y coordinates of the points O, and so on.

Construction of Image Hash Table

Since occlusions, noise, and other changes can cause a triple of basis points on the given curve to not be visible in the corresponding image curve, affine coordinates of all points with respect to more sets of basis triple points may have to be recorded. The resulting Image Hash Table 5 is a data structure that is a convenient way to represent this computed information so that the entries are the basis triples that give rise to a range of affine coordinates. The image hash table is constructed within the Hash Table Construction Module 4 using a suitable quantization of the affine coordinates, and recording the basis points that give rise to the respective affine coordinates. That is:

$$H(\alpha 1 <= \alpha < \alpha 2, \beta 1 <= \beta < \beta 2) = \{<O', P'_1, P'_2> \ldots \}$$

so that for any given affine coordinate $(\alpha,\beta)$ of a point, the possible basis points that gave rise to it can be found by looking in the hash table in the entry $\alpha\_\{1\}<=\alpha<\alpha\_\{2\}$, $\beta\_\{1\}<=\beta<\beta\_\{2\}$. Generalizing to the case of more curves in a curve group, the image hash table is constructed as follows. Each triple of consecutive features in a curve is used as a basis triple, and the affine coordinates of all features in the curve group are computed. Thus the basis points are taken from a single curve, but the affine coordinates are computed for all features on all curves in a curve group.

Since consecutive triples of features are used for basis points, only a linear number of basis points need to be recorded unlike $O(N^3)$ in straightforward geometric hashing. Also, the size of the hash table is $O(N^2)$ as against $O(N^4)$ in ordinary geometric hashing. The computational feasibility of this scheme together with its ability to localize objects makes it an improvement over existing variants of geometric hashing.

Indexing or Word Localization

Figure 4:
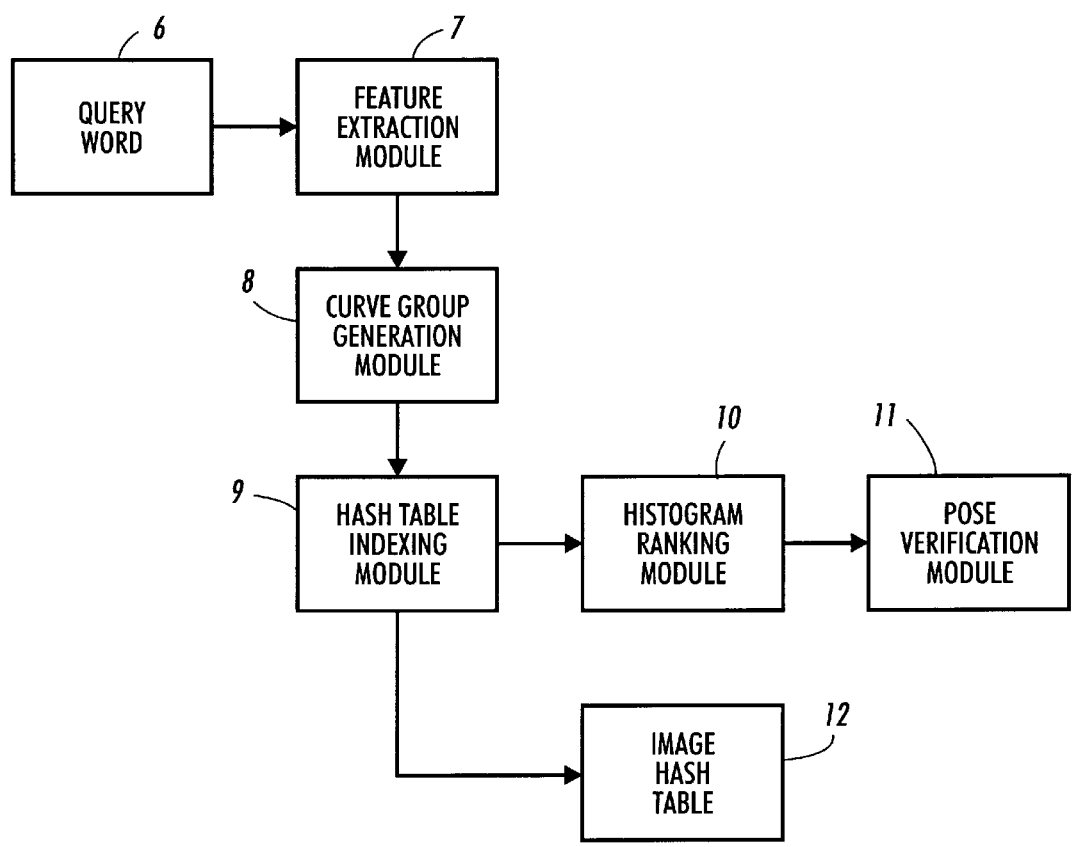
FIG. 4 illustrates a block diagram of modules of the invention engaged in query localization by image indexing of hash tables.

Refer to the block diagram in FIG. 4. During indexing, a Query Word 6 is given to the system, and curve groups are generated from the word using the pre-processing steps and requisite modules (7 and 8) for feature generation described in FIG. 3. The word localization is attempted first using curve groups of longer average curve lengths. For each such curve group, sets of affine coordinates are computed within the Hash Table Indexing Module 9 and used to index the Image Hash Table 12. Since the number of basis points are linear, this operation can be repeated with respect to all basis points in the curve group for robustness. For each basis triple that was indexed using the affine coordinates, the number of times it was indexed (called a hit) as well as the corresponding query triple are recorded. A histogram of the number of hits and the corresponding query word and matching basis points in the document image are recorded within the Histogram Ranking Module 10. The peaks in the histogram are then taken as the candidate locations for the query.

The indexing of the hash table accounts for the breaking of words into word segments in the image (or query word) by generating a set of affine coordinates as follows:
1. Let intra-word separation be: $T=(t_1,t_2)$.
2. For each basis triple $<O,P1,P2>$, and a given feature point P, compute affine coordinates $(\alpha,\beta)$, and $(\alpha'_k,\beta'_k)$ where:

$$\begin{bmatrix} \alpha'_k \\ \beta'_k \end{bmatrix} = \begin{bmatrix} \alpha \\ \beta \end{bmatrix} + \begin{bmatrix} (p_{1x}-o_x) & (p_{2x}-o_x) \\ (p_{1y}-o_y) & p_{2y}-o_y) \end{bmatrix}^{-1} \begin{bmatrix} kt^1 \\ kt^2 \end{bmatrix}$$

and where k is a number representative of the number of curves in a curve group. The value of k is meant to be tuned to the handwriting style of the author (i.e., the way he/she writes words in their characteristic style).
3. Use each of the affine coordinates to index the hash table and record peaks in the histogram of hits as described before.

Verification

The last step of word localization verifies the word at the candidate locations given in the indexing step. This is conducted by the Pose verification module 11. This step involves recovering the pose parameters (A,T) by solving the set of linear equations for the matching basis points corresponding to the significant hits.

Using the pose parameters, all points (i,j) (includes corner features) on curves of the query word are projected into the document image at location (i',j') where $$\begin{pmatrix} i' \\ j' \end{pmatrix} = \begin{pmatrix} a & b \\ c & d \end{pmatrix} \begin{pmatrix} i \\ j \end{pmatrix} + \begin{pmatrix} T_1 \\ T_2 \end{pmatrix}$$

It is then verified if a point feature on each curve in the image lies within some neighborhood of the projected point. The ratio of matched projected points to the total number of points on all curves in the query word constitutes a verification score. The verification is said to succeed if this score is above a suitably chosen threshold. If no matching basis points are verified, then the next most significant query curve group is tried until no more significant groups are left. In practice, however, the correct query localization is achieved early in the indexing operation using the strongest query curve.

EXAMPLE

Figure 1:
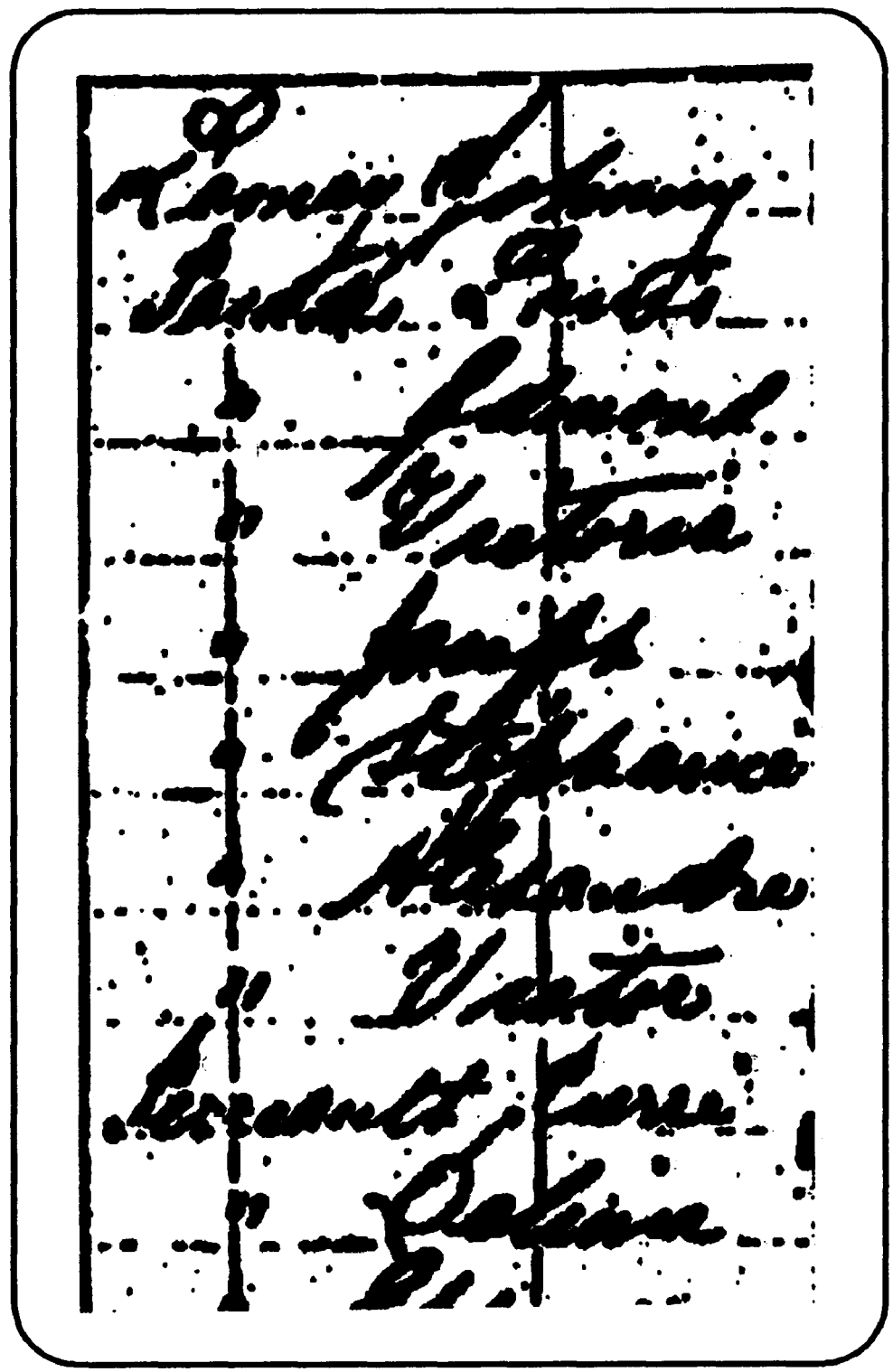
FIG. 1 illustrates a scanned image of a sample handwritten document.
Figure 5A:
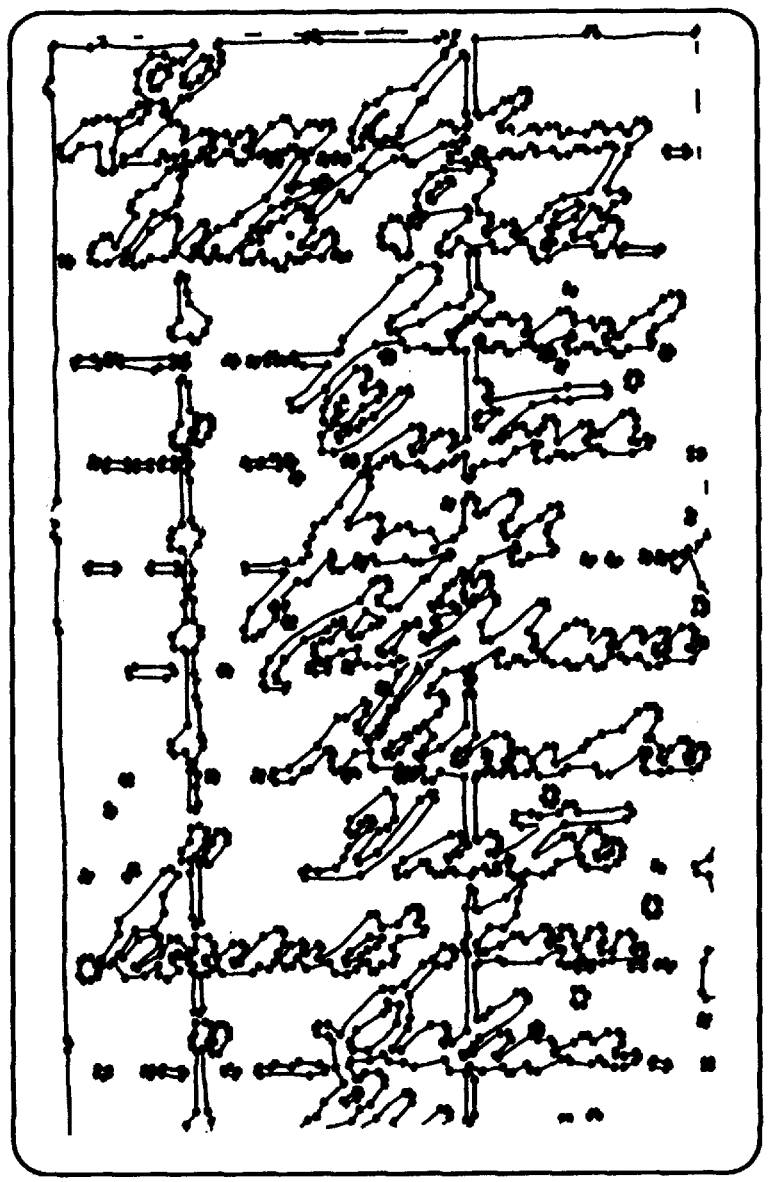
FIG. 5A illustrates curves in the handwritten sample document of FIG. 1 wherein corner features on the curves are shown in circles.
Figure 5B:
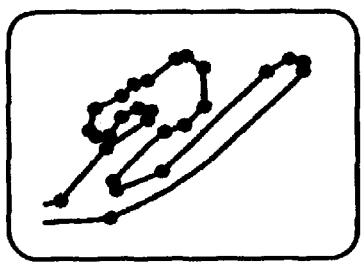
FIG. 5B illustrates a query pattern consisting of a single curve wherein corner features of the curve are used for indexing in a hash table.
Figure 6:
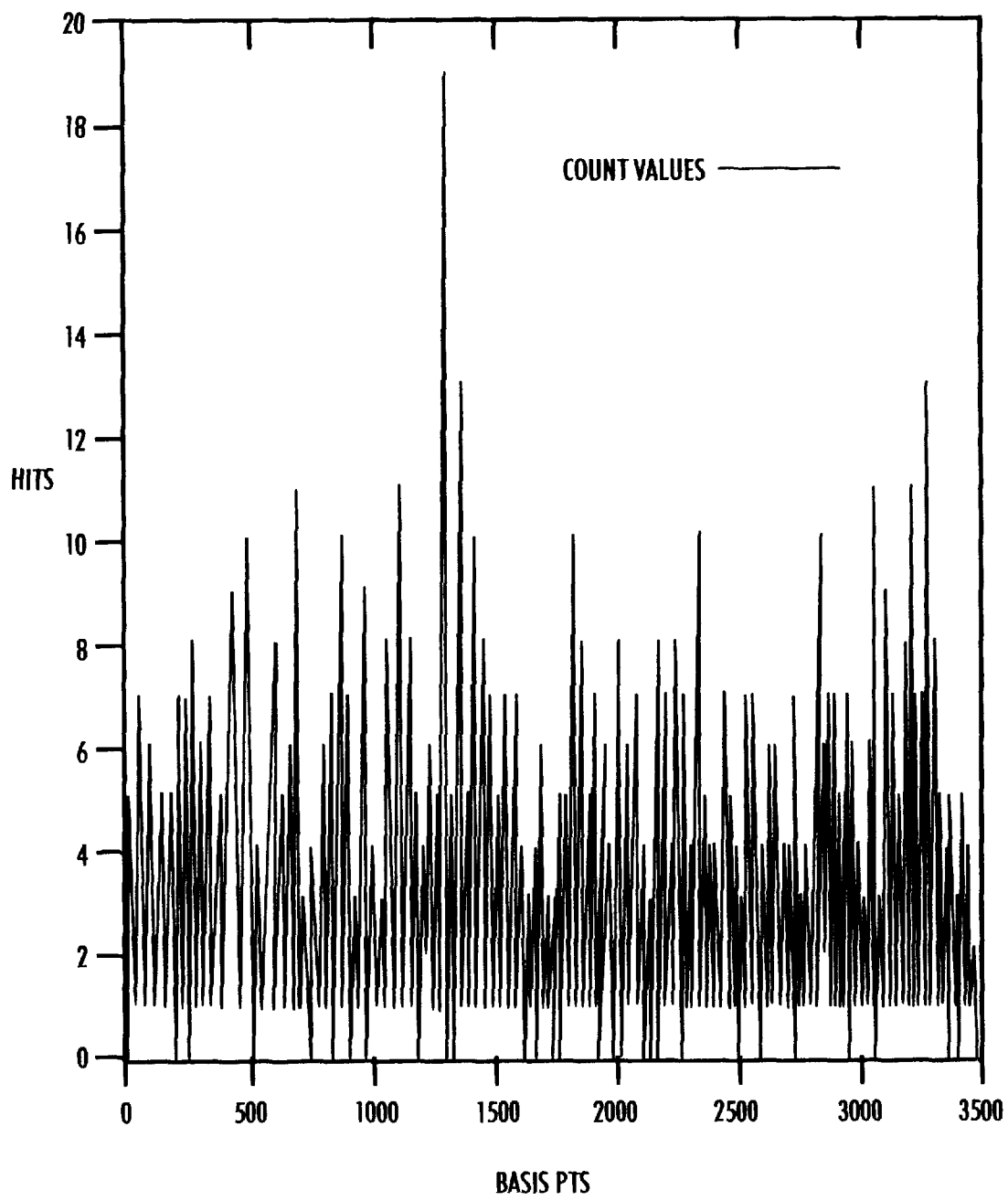
FIG. 6 illustrates a histogram of hits for all basis points in the image of FIG. 5A.
Figure 7:
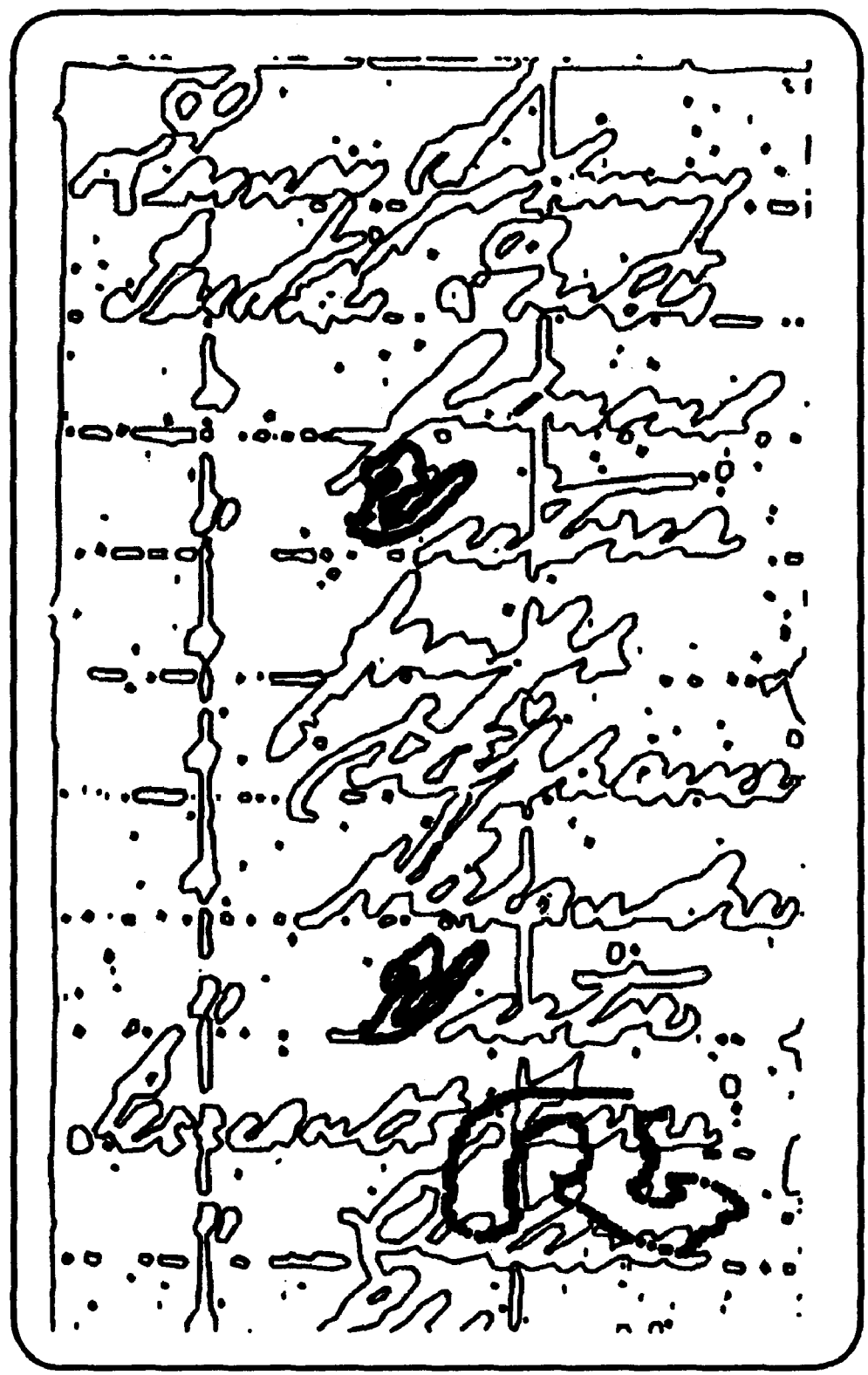
FIG. 7 illustrates Hashing results for FIG. 5A.

FIG. 1 shows a scanned handwritten document and FIG. 5A shows the result of pre-processing and feature extraction on that image. The corner features per curve used for hash table construction are shown as circles in FIG. 5A. There are 179 curves and 2084 corners in all the curves combined. These give rise to 3494 basis points for the hash table. FIG. 5B shows a query pattern consisting of a single curve. FIG. 6 shows the histogram of hashing based on affine coordinates. Here the image basis points are plotted against the number of hits they obtained from affine coordinates on the query pattern. FIG. 7 shows the results of hashing. The hashed image basis points corresponding to the three most significant peaks of the histogram are matched to their respective query basis triples to compute candidate poses. The query curve is then projected into the image using the pose parameters and shown overlayed on the original image in FIG. 7. As can be seen, the top two matches localize the query pattern correctly at the two places it occurs. The third match is however, a false positive which can be removed during pose verification. The false positive occurs in this case because of a merging of the foreground text patterns with the lines of the tabular background in the image.

Referring back to FIG. 2, another illustration of query localization by hashing is shown, this time using curve groups. FIG. 2A shows a sample document in which a word "database" occurs twice. The query word "database" is illustrated in FIG. 2B. The inter-letter spacing between letters of the word is not uniform in the two instances. The query pattern used for indexing is shown in FIG. 2C. Once again the top three matches are shown overlayed (after pose solution) on the original image to indicate query localization. Notice that using the indexing scheme, the word has been localized even when its constituent letters are written with different spacings in the two instances in which it occurs in the image. The false positive match shown here persisted even after pose verification, because of the similarity with the underlying word based on corner features.

Extension to Handwriting Tokenization

By choosing the query handwritten word to be one of the curve groups in the image itself, the above method can be used to identify multiple occurrences of the word in the document without explicitly matching to every single word in the document as is done by other tokenization schemes. Also, by using affine invariant features within curve groups, such a tokenization scheme is robust to changes in orientation, skew, and handwriting variances for a single author.

Generalizing to Locating Arbitrary 2d Objects in Scene Images

By processing natural images to generate curves (perhaps by edge detection and curve tracing), the above method can be generalized to handle arbitrary 2d object shapes in unsegmented natural scene images. The grouping constraint to generate the curve groups may not be as easy to define in such cases as it was for handwritten documents (words are written more or less on a line). Finally, the above method admits other feature units besides corner features on curves. The grouping property, however, must be preserved with any feature unit used for localizing the object.

The foregoing description of the invention has been presented for purposes of illustration and to describe the best mode known for implementing of the invention. It is not intended to be exhaustive or to limit the invention to the precise forms disclosed. Obvious modifications or variations are possible in light of the above teachings. The embodiments were chosen and described in order to best illustrate the principles of the invention and its practical application to thereby enable one of ordinary skill in the art to best utilize the invention in various embodiments and with various modifications as are suited to the particular use contemplated, as long as the principles described herein are followed. Thus, changes can be made in the above-described invention without departing from the intent and scope thereof. Therefore, it is intended that the specification and any examples be considered as exemplary only, with the true scope and spirit of the invention being indicated in the following claims.

I claim:

1. A method of localizing handwritten words in an image of a document, comprising:

a) pre-processing a document containing handwriting where curves with features for word localization are extracted from handwritten words contained in the document, wherein each curve includes selected features with the selected features being less than all of the features for the curve;

b) grouping the curves to form curve groups;

c) computing basis triples from the selected features of the curves of the curve groups;

d) computing affine coordinates for the features of the curves in each curve group with respect to corresponding basis triples computed with said (c);

e) using the affine coordinates and basis triples to create an image hash table with entries for indexing the handwritten words of the document, wherein the image hash table includes a list of the basis triples;

f) indexing the handwritten words with the image hash table, wherein query word features are used to look up the handwritten words in the image hash table for candidate locations; and g) verifying registration of underlying words within the image hash table by projecting a query word onto one of the underlying words at the candidate locations to find a match.

2. The method of of claim 1, in which basis points are taken from a single curve, wherein said (d) includes computing affine coordinates for all features on all curves in a curve group.

3. The method of claim 2, further comprising accommodating for changes in appearance of handwritten words in terms of orientation, skew and intra-word separation.

4. The method of claim 1, wherein the localizing is performed on a document obtained from either an image reading or electronic source.

5. The method of claim 1, wherein said (g) includes recovering pose parameters by solving a set of linear equations to verify that a word corresponds with a candidate location.

6. The method of claim 1, wherein said (g) includes:
   generating a verification score from curves; and
   determining whether the verification score exceeds a selected threshold.

7. The method of claim 1, further comprising providing the curves with corners, wherein the selected features comprise the corners.

8. The method of claim 1, further comprising using consecutive triples of features for basis points.

9. The method of claim 1, in which consecutive triples are used for basis points, wherein said (c) includes computing a linear number of basis points.

* * * * *